United States Patent
Noguchi et al.

(10) Patent No.: US 6,301,093 B1
(45) Date of Patent: Oct. 9, 2001

(54) ELECTROCHEMICAL CAPACITOR

(75) Inventors: Minoru Noguchi; Tatsuya Suzuki; Yoshio Yamamoto; Kenji Matsumoto; Takashi Higono, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/478,521

(22) Filed: Jan. 6, 2000

(30) Foreign Application Priority Data

Jan. 14, 1999 (JP) .................................................. 11-007517

(51) Int. Cl.⁷ ..................................................... H01G 9/02
(52) U.S. Cl. ........................ 361/512; 361/512; 361/523; 361/502; 361/516; 429/192; 429/218
(58) Field of Search ..................................... 361/512, 502, 361/433, 272, 524, 525, 523, 528, 516

(56) References Cited

U.S. PATENT DOCUMENTS

| 5,219,680 | * | 6/1993 | Fauteux | 429/192 |
| 5,428,501 | * | 6/1995 | Bruder | 361/535 |
| 5,429,893 | * | 7/1995 | Thomas | 429/218 |
| 5,549,988 | * | 8/1996 | Reichert et al. | 429/192 |
| 5,549,989 | * | 8/1996 | Anani | 429/193 |
| 5,568,353 | * | 10/1996 | Bai et al. | 361/523 |
| 6,110,335 | * | 8/2000 | Avarbz et al. | 204/294 |
| 6,130,004 | * | 10/2000 | Li et al. | 429/218.1 |

* cited by examiner

Primary Examiner—Dean A. Reichard
Assistant Examiner—Nguyen T Ha
(74) Attorney, Agent, or Firm—Arent Fox Kintner Plotkin & Kahn, PLLC

(57) ABSTRACT

An electrochemical capacitor has a pair of positive and negative electrode elements each having a solid electrode disposed on a surface of a current collector. The positive and negative electrode elements are disposed in confronting relation to each other with a separator interposed therebetween. The positive and negative electrode elements, together with an electrolytic solution, are housed in the casing. The solid electrode of the negative electrode element is made of a lithium vanadium oxide and an electrically conductive filler, and the solid electrode of the positive electrode element is made of activated carbon.

6 Claims, 4 Drawing Sheets

ELECTROCHEMICAL CAPACITOR

BACKGROUND OF THE INVENTION

1. Field of the Invention

The present invention relates to an electrochemical capacitor.

2. Description of the Related Art

There has heretofore been known an electric double-layer capacitor having positive and negative electrode elements disposed in confronting relation to each other with a separator interposed therebetween. Each of the positive and negative electrode elements having a solid electrode made of activated carbon on the surface of a current collector such as of metal foil or the like. The positive and negative electrode elements are sealed together with an electrolytic solution in a casing which has terminals connected to the respective current collectors.

In the above conventional electric double-layer capacitor, the solid electrode is made of activated carbon as a substance having a large specific surface area. However, the electric double-layer capacitor having solid electrodes of activated carbon has an energy density lower than secondary cells that operate based on a chemical reaction. In view of such a drawback, there has been proposed an electrochemical capacitor having solid electrodes made of a material which is capable of producing pseudocapacitance owing to an electrochemical reaction. Various materials including ruthenium oxide capable of producing pseudocapacitance have been reviewed for use as solid electrode materials. However, these materials are disadvantageous in that they are expensive.

SUMMARY OF THE INVENTION

It is therefore an object of the present invention to provide an electrochemical capacitor which is relatively inexpensive to manufacture and has excellent discharging characteristics.

The inventors have employed a lithium vanadium oxide that is available inexpensively as a cell material capable of producing pseudocapacitance, and produced a solid electrode containing a lithium vanadium oxide. In the lithium vanadium oxide, a vanadium oxide can be either tetravalent or pentavalent. The lithium vanadium oxide exists stably as either a tetravalent or pentavalent oxide because of the presence of lithium. As a result, the lithium vanadium oxide can cause an electrochemical reaction and operates as a cell in the presence of an electrolytic solution, so that it can produce pseudocapacitance in a capacitor.

The inventors have studied various discharging characteristics of solid electrodes containing a lithium vanadium oxide. As a consequence, the inventors have found that excellent discharging characteristics are obtained by an electrochemical capacitor having a negative solid electrode containing a lithium vanadium oxide and a positive solid electrode made of activated carbon, and have completed by the invention based on the finding.

To achieve the above object, there is provided in accordance with the present invention an electrochemical capacitor comprising a casing and a pair of positive and negative electrode elements each having a solid electrode disposed on a surface of a current collector, the positive and negative electrode elements being disposed in confronting relation to each other with a separator interposed therebetween, the positive and negative electrode elements, together with an electrolytic solution, being housed in the casing, the solid electrode of the negative electrode element being made of a lithium vanadium oxide and an electrically conductive filler, the solid electrode of the positive electrode element being made of activated carbon.

In the electrochemical capacitor according to the present invention, the negative electrode element has a solid electrode made of a lithium vanadium oxide and an electrically conductive filler, and positive electrode element has a solid electrode made of activated carbon. These solid electrodes are effective to prevent a sharp voltage drop from occurring at the positive electrode element when the electrochemical capacitor starts being discharged, to increase the period of time for which the electrochemical capacitor can produce a high voltage, and to enable the electrochemical capacitor to discharge a large amount of electric energy.

The electrochemical capacitor according to the present invention can be manufactured inexpensively because the lithium vanadium oxide is used as a substance for producing pseudocapacitance. The electrically conductive filler, which together with the lithium vanadium oxide makes up the solid electrode of the negative electrode element, is required to increase the electric conductivity of the solid electrode.

Since the lithium vanadium oxide can cause an electrochemical reaction and operates as a cell in the presence of an electrolytic solution, the vanadium oxide should preferably be tetravalent or pentavalent. The lithium vanadium oxide may comprise at least one oxide selected from the group consisting of $LiV_3O_8$, $LiV_2O_5$, and $Li_2V_2O_5$. The vanadium in $LiV_3O_8$ is pentavalent, the vanadium in $LiV_2O_5$ is a mixture of tetravalent and pentavalent vanadium, and the vanadium in $Li_2V_2O_5$ is tetravalent.

The electrically conductive filler may comprise carbon black or the like. The electrically conductive filler is used to adjust the electric conductivity of the solid electrode, and its amount differs depending on the application of the electrochemical capacitor. For example, the electrically conductive filler is added in an increased amount in order to reduce the resistance of the solid electrode for a high output level, and added in a reduced amount in order to reduce the output density for a high energy density.

The electrically conductive filler is in the range from 3 through 80 weight % of the total weight of the solid electrode. If the amount of the electrically conductive filler were less than 3 weight % of the total weight of the solid electrode, then the resistance of the electrode would be too high to discharge the electrochemical capacitor well. If the amount of the electrically conductive filler were in excess of 80 weight % of the total weight of the solid electrode, then the energy density of the electrode would be lowered.

The activated carbon of the solid electrode of the positive electrode element has a specific surface area in the range from 100 to 3000 $m^2/g$. If the specific surface area of the activated carbon were less than 100 $m^2/g$, then the electrostatic capacitance per volume would be excessively small. If the specific surface area of the activated carbon were greater than 3000 $m^2/g$, then the bulk density would be reduced.

The electrolytic solution comprises a propylene carbonate solution of $LiBF_4$ or $LiPF_6$. Positive ions of the electrolytic salt should preferably be $Li^+$ because the vanadium oxide capable of producing pseudocapacitance at the negative electrode element charges and discharges electric energy by reversibly doping and undoping $Li^+$. Negative ions of the electrolytic salt should preferably be $BF_4^-$ or $PF_6^-$ because it has a high withstand voltage and a high electric conductivity, can easily be produced industrially, and has a low toxic level. The solvent of the electrolytic salt should preferably propylene carbonate since it has a high withstand voltage and a high electric conductivity and can be used in a wide temperature range.

The electrolytic solution has a concentration in the range from 0.5 to 1.5 mol/liter. If the concentration of the electrolytic solution were lower than 0.5 mol/liter, then the resistance would be increased. If the concentration of the electrolytic solution were greater than 1.5 mol/liter, then the electrolytic salt might separate out at low temperatures.

The above and other objects, features, and advantages of the present invention will become apparent from the following description when taken in conjunction with the accompanying drawings which illustrate preferred embodiments of the present invention by way of example.

DESCRIPTION OF THE PREFERRED EMBODIMENT

1st Embodiment

Figure 1:
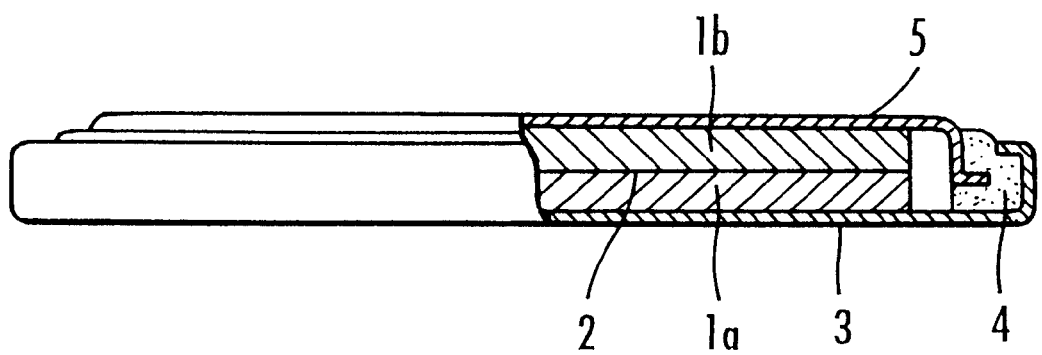
FIG. 1 is a side elevational view, partly in cross section, of an electrochemical capacitor according to a first embodiment of the present invention.

As shown in FIG. 1, an electrochemical capacitor according to a first embodiment of the present invention has a positive solid electrode 1a and a negative solid electrode 1b disposed in confronting relation to each other with a separator 2 interposed as an insulator therebetween, and a disk-shaped casing 3 of aluminum which houses the positive and negative solid electrodes 1a, 1b and the separator 2 therein. The separator 2 is made of glass fibers, for example. The positive and negative solid electrodes 1a, 1b and the separator 2 are housed together with an electrolytic solution (not shown) in the casing 3. The casing 3 is sealed by a lid 5 of aluminum whose circumferential edge is joined to the casing 3 by a gasket 4 of synthetic resin.

The solid electrodes 1a, 1b are bonded to inner surfaces of the casing 3 and the lid 5, respectively, by an electrically conductive adhesive or the like. The inner surfaces of the casing 3 and the lid 5 serve as current collectors for the solid electrodes 1a, 1b. The casing 3 has an outer surface that can be used as a negative connection terminal, and the lid 5 has an outer surface that can be used as a positive connection terminal.

An electrochemical capacitor according to a comparative example will be described below. The electrochemical capacitor according to the comparative example is of a physical structure identical to the inventive electrochemical capacitor shown in FIG. 1. According to the comparative example, the solid electrodes 1a, 1b contain a lithium vanadium oxide ($LiV_3O_8$). Specifically, the solid electrodes 1a, 1b are produced by mixing 45 parts by weight of lithium vanadium oxide ($LiV_3O_8$), 45 parts by weight of an electrically conductive filler of carbon black (tradename DENKA BLACK, manufactured by Denki Kagaku Kogyo K.K.), and 10 parts by weight of polytetrafluoroethylene as a binder, and pressing the mixed to a disk shape having a diameter of 20 mm. Each of the solid electrodes 1a, 1b has a weight of 150 mg.

The lithium vanadium oxide can be prepared according to a sol-gel process by mixing a predetermined amount of a solution of lithium propoxide dissolved by an organic solvent and a predetermined amount of a solution of vanadium propoxide dissolved by an organic solvent, and hydrolyzing and condensing the mixture.

The electrolytic solution comprises a propylene carbonate solution of lithium tetrafluoroborate ($LiBF_4$) and has a concentration of 1 mol/liter.

Figure 2:
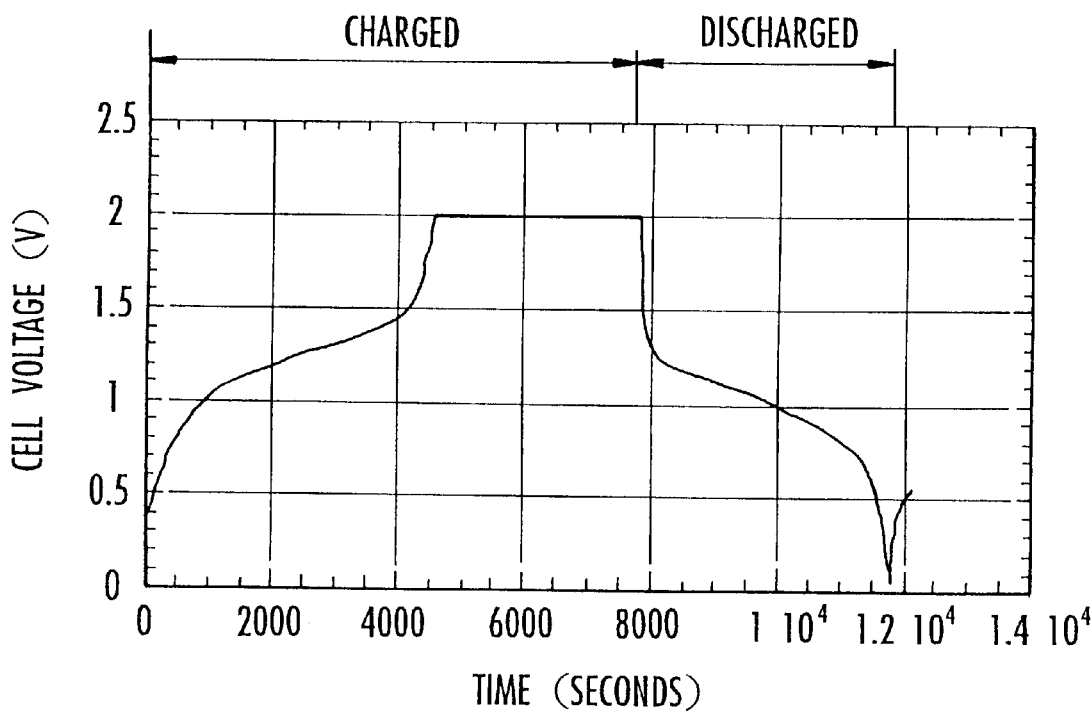
FIG. 2 is a graph showing charging and discharging characteristics of an electrochemical capacitor according to a comparative example.

FIG. 2 shows a charging and discharging curve plotted when the electrochemical capacitor according to the comparative example was charged with a constant current at a constant voltage. Specifically, the electrochemical capacitor according to the comparative example was charged with a constant current of 5 mA, and after the charged voltage reached 2 V, the electrochemical capacitor according to the comparative example was charged at a constant voltage of 2 V for 2 hours. It can be seen from FIG. 2 that the voltage across the electrochemical capacitor according to the comparative example dropped sharply when it started being discharged.

Figure 3:
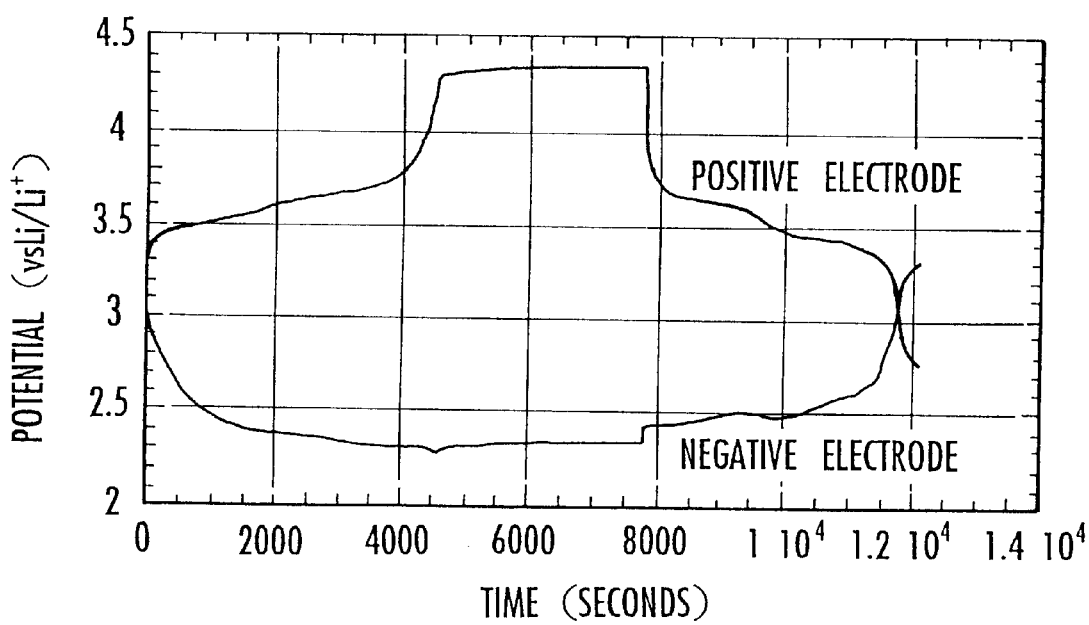
FIG. 3 is a graph showing charging and discharging characteristics of each solid electrode of the electrochemical capacitor according to the comparative example.

FIG. 3 shows a charging and discharging curve of the potentials of the electrodes measured by a three-electrode process using a lithium electrode as a reference electrode, the curve being plotted when the electrochemical capacitor according to the comparative example was charged under the same conditions as those for the charging and discharging curve shown in FIG. 2. It can be understood from FIG. 3 that the sharp voltage drop upon start of the discharging of the electrochemical capacitor according to the comparative example occurred at the positive electrode.

In the electrochemical capacitor according to the first embodiment of the present invention, the negative solid electrode 1a contains a lithium vanadium oxide ($LiV_3O_8$), and the positive solid electrode 1b is made of activated carbon. The negative solid electrode 1a according to the first embodiment is identical to the negative solid electrode 1a according to the comparative example. That is, the negative solid electrode 1a according to the first embodiment is produced by mixing 45 parts by weight of lithium vanadium oxide ($LiV_3O_8$), 45 parts by weight of an electrically conductive filler of carbon black (tradename DENKA BLACK, manufactured by Denki Kagaku Kogyo K.K.), and 10 parts by weight of polytetrafluoroethylene as a binder, and pressing the mixed to a disk shape having a diameter of 20 mm. The solid electrode 1a has a weight of 150 mg. The electrically conductive filler may be KETJEN BLACK (tradename) manufactured by Mitsubishi Chemical Corp. or PRINTEX (tradename) manufactured by Dekusa, or the like, rather than DENKA BLACK manufactured by Denki Kagaku Kogyo K.K.

The positive solid electrode 1b is made of steam-activated carbon or alkali-activated carbon whose specific surface area is in the range from 100 to 3000 $m^2/g$. The carbon may be BAC-PW (tradename) manufactured by Kureha Chemical Industry Co., Ltd., for example. The positive solid electrode 1b is prepared by shaping the carbon into a disk form having a diameter of 20 mm, and has a weight of 100 mg.

The electrolytic solution comprises a propylene carbonate solution of lithium tetrafluoroborate ($LiBF_4$) and has a concentration of 1 mol/liter. However, the electrolytic solution is not limited to the above solution, but may comprise another known electrolytic solution, e.g., a propylene carbonate solution of lithium hexafluorophosphate ($LiPF_6$).

Figure 4:
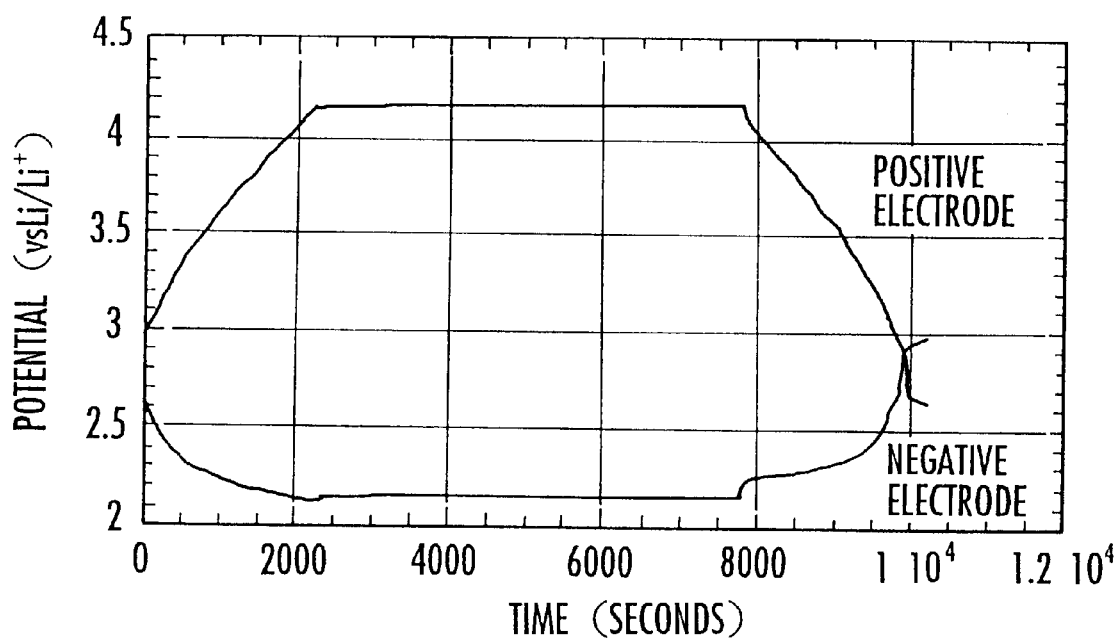
FIG. 4 is a graph showing charging and discharging characteristics of each solid electrode of the electrochemical capacitor according to the first embodiment of the present invention.

FIG. 4 shows a charging and discharging curve of the potentials of the electrodes measured by a three-electrode process using a lithium electrode as a reference electrode, the curve being plotted when the electrochemical capacitor according to the first embodiment of the present invention was charged under the same conditions as those for the charging and discharging curve shown in FIG. 2.

It can be understood from FIG. 4 that no sharp voltage drop occurred at the positive electrode upon start of the discharging of the electrochemical capacitor according to the first embodiment of the present invention, and the electrochemical capacitor is capable of discharging a large amount of electric energy.

Figure 5:
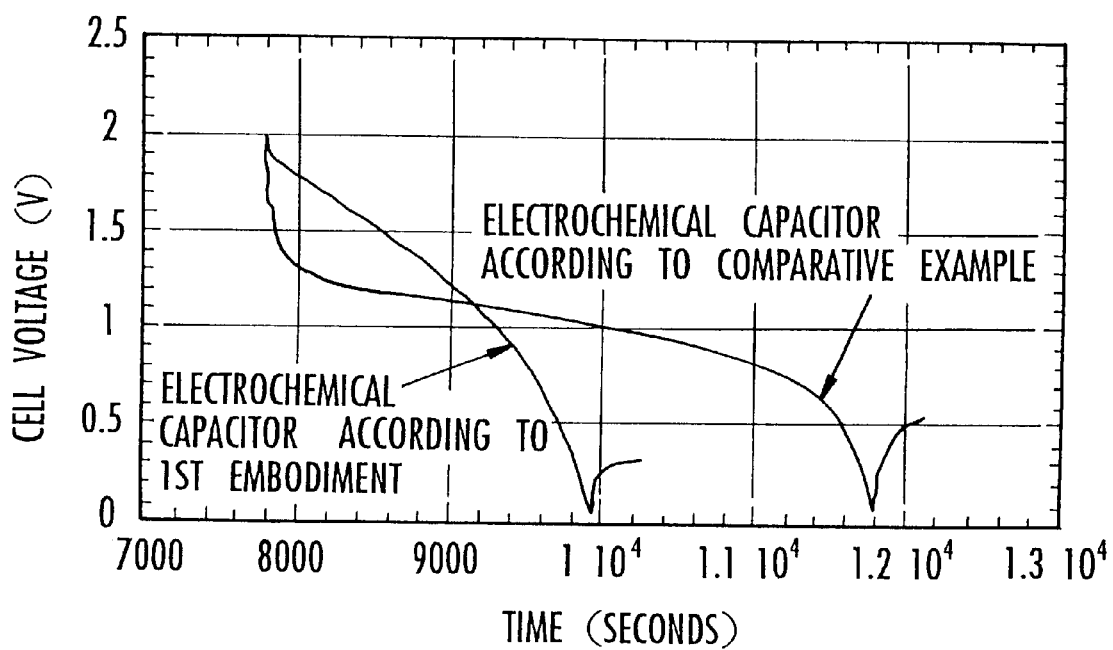
FIG. 5 is a graph showing charging and discharging characteristics of the electrochemical capacitors according to the first embodiment and the comparative example.

The electrochemical capacitors according to the first embodiment and the comparative example were charged with the constant current at the constant voltage under the same conditions as those for the charging and discharging curve shown in FIG. 2, and measured for various properties. The measured properties of the electrochemical capacitors according to the first embodiment and the comparative example are given in Table 1 shown below, and their charging and discharging curves are shown in FIG. 5.

TABLE 1

|  | Electrode density | Electric capacitance (F/cc) | Electric capacitance (F/g) | Discharged energy (Wh/kg) |
|---|---|---|---|---|
| Embodiment 1 | 1.14 | 53.5 | 29.7 | 46.5 |
| Com. Ex. | 2.03 | 77.3 | 157.0 | 41.7 |

A review of Table 1 indicates that the electrochemical capacitor according to the first embodiment can discharge a greater amount of electric energy than the electrochemical capacitor according to the comparative example. A study of FIG. 5 shows that since the electrochemical capacitor according to the first embodiment does not suffer a sharp voltage drop immediately after it starts being discharged, the period of time for which the electrochemical capacitor according to the first embodiment can produce a high voltage is longer than the period of time for which the electrochemical capacitor according to the comparative example can produce a high voltage.

The electrochemical capacitor according to the first embodiment and a conventional electrochemical capacitor were charged with a constant current at a constant voltage as follows: Each electrochemical capacitor was charged with a constant current of 5 mA, and after the charged voltage reached 2.5 V, the electrochemical capacitor according to the comparative example was charged at a constant voltage of 2.5 V for 2 hours. The conventional electrochemical capacitor is an electric double-layer capacitor which has the same physical structure as that shown in FIG. 1. In the conventional electrochemical capacitor, each of the solid electrodes $1a$, $1b$ is prepared by shaping activated carbon (BAC-PW (tradename) manufactured by Kureha Chemical Industry Co., Ltd.) into a disk form having a diameter of 20 mm. Each of the solid electrodes $1a$, $1b$ has a weight of 100 mg.

Figure 6:
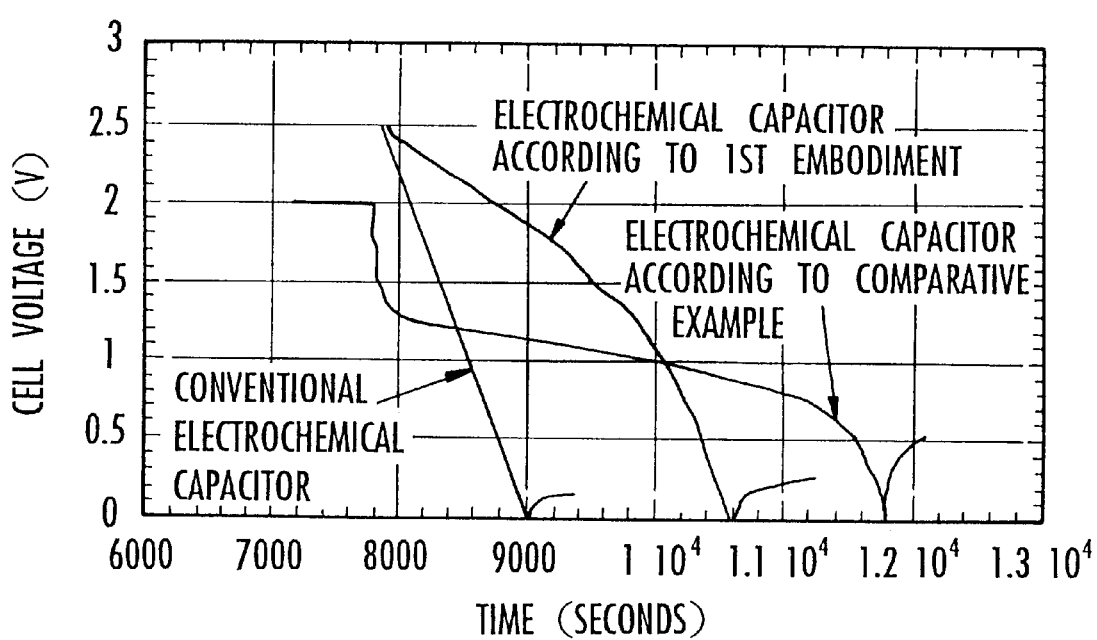
FIG. 6 is a graph showing charging and discharging characteristics of the electrochemical capacitors according to the first embodiment and the comparative example, and a conventional electrochemical capacitor.

A property of the electrochemical capacitors is given in Table 2 below, and their charging and discharging curves are shown in FIG. 6. FIG. 6 also shows the charging and discharging curve (see FIG. 5) of the electrochemical capacitor according to the comparative example.

TABLE 2

|  | Discharged energy (Wh/kg) |
|---|---|
| Embodiment 1 | 57.1 |
| Conventional | 22.8 |

Table 1 reveals that the electrochemical capacitor according to the first embodiment can discharge a greater amount of electric energy than the conventional electrochemical capacitor (electric double-layer capacitor). While it can be seen from FIG. 5 shows that the period of time for which the electrochemical capacitor according to the first embodiment can produce a high voltage is longer than the period of time for which the electrochemical capacitor according to the comparative example can produce a high voltage, the period of time for which the electrochemical capacitor according to the first embodiment can produce a high voltage is also longer than the period of time for which the conventional electrochemical capacitor (electric double-layer capacitor) can produce a high voltage.

2nd Embodiment

An electrochemical capacitor according to a second embodiment has the structure shown in FIG. 1, and is manufactured in the same manner as the electrochemical capacitor according to the first embodiment except that the lithium vanadium oxide has changed from $LiV_3O_8$ used in the first embodiment to $LiV_2O_5$ containing a mixture of tetravalent vanadium and pentavalent vanadium.

The electrochemical capacitor according to the second embodiment was charged with the constant current at the constant voltage under the same conditions as those for the charging and discharging curve shown in FIG. 2, and measured for various properties. The measured properties of the electrochemical capacitors according to the second embodiment, together with the properties of the electrochemical capacitor according to the first embodiment (which are the same as the numerical values in Table 1), are given in Table 3 shown below.

3rd Embodiment

An electrochemical capacitor according to a third embodiment has the structure shown in FIG. 1, and is manufactured in the same manner as the electrochemical capacitor according to the first embodiment except that the lithium vanadium oxide has changed from $LiV_3O_8$ used in the first embodiment to $Li_2V_2O_5$ containing tetravalent vanadium.

The electrochemical capacitor according to the third embodiment was charged with the constant current at the constant voltage under the same conditions as those for the charging and discharging curve shown in FIG. 2, and measured for various properties. The measured properties of the electrochemical capacitors according to the third embodiment, together with the properties of the electrochemical capacitor according to the first embodiment (which are the same as the numerical values in Table 1), are given in Table 3 shown below.

TABLE 3

|  | Electrode density | Electric capacitance (F/cc) | Electric capacitance (F/g) | Discharged energy (Wh/kg) |
|---|---|---|---|---|
| Embodiment 1 | 1.14 | 53.5 | 29.7 | 46.5 |
| Embodiment 2 | 1.16 | 50.2 | 27.8 | 43.5 |
| Embodiment 3 | 1.10 | 48.7 | 27.0 | 42.2 |

It can be seen from Table 3 that the electrochemical capacitor according to the second embodiment which employs $LiV_2O_5$ containing a mixture of tetravalent vanadium and pentavalent vanadium as a lithium vanadium oxide, and the electrochemical capacitor according to the third embodiment which employs $Li_2V_2O_5$ containing tetravalent vanadium as a lithium vanadium oxide offer the same performance as the electrochemical capacitor according to the first embodiment which employs $LiV_3O_8$ containing pentavalent vanadium.

In each of the above embodiments, the electrochemical capacitor has the physical structure shown in FIG. 1. However, the electrochemical capacitor according to the present invention is not limited to the physical structure shown in FIG. 1, but may be of other structures including a structure where a plurality of positive and negative electrode elements each having a polarized electrode disposed on a current collector are alternately laminated with separators interposed therebetween, and leads extending from the current collectors are connected to positive and negative connection terminals.

Although certain preferred embodiments of the present invention have been shown and described in detail, it should be understood that various changes and modifications may be made therein without departing from the scope of the appended claims.

What is claimed is:

1. An electrochemical capacitor comprising:

a casing; and a pair of positive and negative electrode elements each having a solid electrode disposed on a surface of a current collector, said positive and negative electrode elements being disposed in confronting relation to each other with a separator interposed therebetween, said positive and negative electrode elements, together with an electrolytic solution, being housed in said casing;

said solid electrode of the negative electrode element being made of a lithium vanadium oxide and an electrically conductive filler, said solid electrode of the positive electrode element being made of activated carbon.

2. An electrochemical capacitor according to claim 1, wherein said lithium vanadium oxide comprises at least one oxide selected from the group consisting of $LiV_3O_8$, $LiV_2O_5$, and $Li_2V_2O_5$.

3. An electrochemical capacitor according to claim 1, wherein said electrically conductive filler is in the range from 3 through 80 weight % of the total weight of the solid electrode.

4. An electrochemical capacitor according to claim 1, wherein said activated carbon has a specific surface area in the range from 100 to 3000 $m^2/g$.

5. An electrochemical capacitor according to claim 1, wherein said electrolytic solution comprises a propylene carbonate solution of $LiBF_4$ or $LiPF_6$.

6. An electrochemical capacitor according to claim 5, wherein said electrolytic solution has a concentration in the range from 0.5 to 1.5 mol/liter.

* * * * *